United States Patent
Davies et al.

[11] Patent Number: 5,911,514
[45] Date of Patent: *Jun. 15, 1999

[54] PLAIN BEARING WITH POLYTETRAFLUOROETHYLENE-BASED LINING

[75] Inventors: Glyndwr John Davies; Philip Moisey, both of Rugby; Janette Johnston, Kilmarnock, all of United Kingdom

[73] Assignee: T&N Technology Limited, Rugby, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/553,597
[22] PCT Filed: Jul. 12, 1994
[86] PCT No.: PCT/GB94/01508
§ 371 Date: Dec. 6, 1995
§ 102(e) Date: Dec. 6, 1995
[87] PCT Pub. No.: WO95/02772
PCT Pub. Date: Jan. 26, 1995

[30] Foreign Application Priority Data

Jul. 14, 1993 [GB] United Kingdom ............ 9314582

[51] Int. Cl.⁶ ............... F16C 33/02; F16C 33/18
[52] U.S. Cl. ............ 384/300; 384/279; 384/902; 384/911; 384/908
[58] Field of Search ............... 384/279, 298, 384/300, 902, 908, 911, 276, 297, 299

[56] References Cited

U.S. PATENT DOCUMENTS

| | | | |
|---|---|---|---|
| 4,387,178 | 6/1983 | Tracy et al. | 524/448 |
| 4,431,069 | 2/1984 | Dickinson, III et al. | 175/61 |
| 4,501,337 | 2/1985 | Dickinson, III et al. | 175/171 |
| 4,659,754 | 4/1987 | Edwards et al. | 523/214 |
| 4,871,004 | 10/1989 | Brown et al. | 152/209 R |
| 5,068,265 | 11/1991 | Casey et al. | 523/176 |
| 5,080,970 | 1/1992 | Davies | 428/332 |
| 5,271,679 | 12/1993 | Yamazumi et al. | 384/527 |
| 5,354,622 | 10/1994 | Nakamaru et al. | 428/551 |
| 5,433,870 | 7/1995 | Nakamaru et al. | 252/12.4 |

FOREIGN PATENT DOCUMENTS

| | | |
|---|---|---|
| 0232922 | 8/1987 | European Pat. Off. . |
| 0234602 | 9/1987 | European Pat. Off. . |
| 61-098767 | 5/1986 | Japan . |
| 2166142 | 10/1985 | United Kingdom . |
| 2166142 | 4/1986 | United Kingdom . |

*Primary Examiner*—John A. Jeffery
*Assistant Examiner*—Matthew A. Kaness
*Attorney, Agent, or Firm*—Synnestvedt & Lechner LLP

[57] ABSTRACT

The bearing comprises a metal backing, a sintered layer on said metal backing, and a lining layer infiltrated into pores of the sintered layer and standing proud thereof to provide a bearing surface. The lining layer comprises polytetrafluoroethylene including 2 to 10% by volume of fibrillated aramid fibers.

11 Claims, 1 Drawing Sheet

PLAIN BEARING WITH POLYTETRAFLUOROETHYLENE-BASED LINING

BACKGROUND OF THE INVENTION

1. Field of the Invention

This invention is concerned with plain bearings, in particular, oil lubricated bearings which require low friction, particularly static (break-away) friction.

Polytetrafluoroethylene (hereinafter referred to as "PTFE") has good tribological properties and is, therefore, often used as the lining material for a plain bearing. PTFE is, however, soft and weak and has an unacceptably high wear rate when used alone. Therefore, harder materials must be added to the PTFE lining to reduce wear and give an acceptable bearing life.

2. Description of the Related Art

Bearings are known which comprise a steel backing having a porous bronze sintered layer thereon and a lining layer infiltrated into pores of the sintered layer and standing proud of the sintered layer to provide a low-friction surface of the bearing. Such bearing layers comprise PTFE filled with either lead or molybdenum disulphide. However, these conventional materials tend to suffer from erosion effects when used under severe conditions in an oil-lubricated bearing. This is caused by cavitation brought about by the lubricating oil and results in the removal of the filled PTFE from the sinter by the action of the lubricating oil alone, without rubbing wear.

GB Patent Specification No 2,166,142B describes a bearing of this type in which an ionic fluoride, for example calcium fluoride, is included in the lining layer. This lining material shows enhanced cavitation erosion resistance while retaining desirable low friction properties. It is, however, desirable to provide a bearing of this type having even better erosion resistance properties.

BRIEF DESCRIPTION OF DRAWINGS

FIG. 1 shows mush 13 in position on a sintered layer 14 which in turn is on a backing 12. FIG. 2 shows the same configuration as FIG. 1 but with paper 15 in position instead of mush 13.

DESCRIPTION OF INVENTION AND PREFERRED EMBODIMENT

Figure 1:
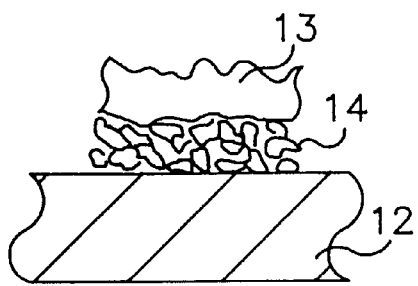
FIGS. 1 and 2 show steps in the production of a bearing according to the invention. More specifically.
Figure 2:
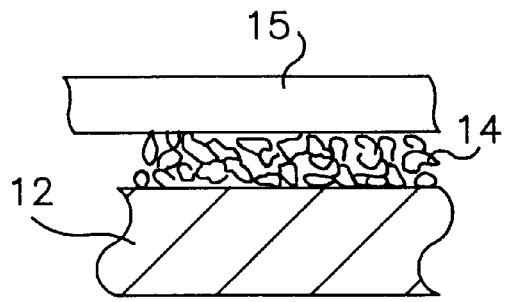
Figure 3:
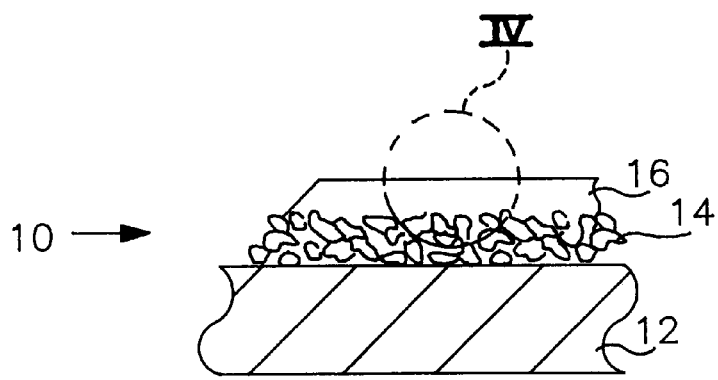
FIG. 3 shows a bearing 10 after the mush or paper has been compressed into the pores 18 of the sintered layer 14 to form the lining 16.
Figure 4:
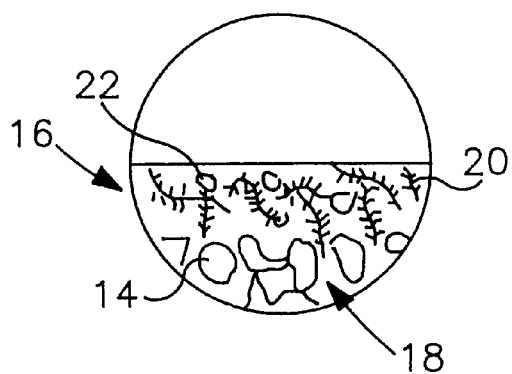
FIG. 4 is an enlargement of the circle 4 in FIG. 3 and shows the pores 18, fibers 20 and filler 22.

The invention provides a plain bearing 10, as shown in FIG. 1 comprising a metal backing, a sintered layer 12 on said metal backing 11, and a lining layer 13 infiltrated into pores of the sintered layer 12 but standing proud of the sintered layer 12 to provide a low-friction surface of the bearing 10, characterised in that said lining layer 13 comprises polytetrafluoroethylene including 2 to 10% by volume of fibrillated aramid fibres.

A plain bearing according to the invention exhibits higher cavitation erosion resistance than the above-mentioned known materials.

It is, of course, a well-known technique for reinforcing plastics materials to incorporate fibres therein. However, reinforcement of PTFE in plain bearings by this means has not been successfully utilised. This is because the common fibres which can stand the temperatures and pressures involved, such as glass, do not adhere to the PTFE so that there is no benefit from the incorporation of such fibres. Indeed, non-fibrillated aramid fibres do not provide any benefit. The invention is, however, based on the discovery that fibrillated aramid fibres do give an enhanced cavitation erosion resistance. It is summised that the fibrils embed themselves in the PTFE matrix and are difficult to pull out due to entanglements and the high aspect ratios thereof.

Preferably, the lining layer also contains a filler which may be present in up to 28% by volume. The filler may be, for example, calcium fluoride or polyphenyl sulphide. Preferably, the total of the filler and the fibres approximates to 20% by volume.

Alternatively, the filler may be a polymeric material selected from:

Tetrafluoroethylene-perfluoroalkylvinylether copolymers

Tetrafluoroethylene-hexafluoropropylene copolymer

Tetrafluoroethylene propylene ether polymer

Tetrafluoroethylene-ethylene copolymers

Polychlorotrifluoroethylene polymers

Polychlorotrifluoroethylene-ethylene copolymers

Hexafluoroisobutylene polymers

Hexafluoroisobutylene-vinylidene fluoride copolymers and

Hexafluoro propylene polymer.

In order to improve the adhesion of the fibres, the lining layer may also include a further polymeric material which wets the fibres and is distributed throughout the lining layer so that the fibres are anchored in the lining layer by adhesion to said further polymeric material. The further polymeric material is preferably polyphenylene sulphide which forms 10% to 60% of the polymereic material presesnt. The further polymeric material may be present as domains rich in said other polymeric material distributed throughout said surface material. In this case, the fibres are anchored by adhesion to said domains which are too large to "pull" through the PTFE.

The average length of the fibres used in the invention may be 0.2–1.0 mm, their diameter prior to fibrillation may be 0.012 mm–0.015 mm, and the degree of fibrillation (as measured as Canadian Freeness) may be 200 (Du Pont method TM 0894-84, Reference TAPPI-T-227M-58).

The invention also provides a method of manufacturing a plain bearing according to the invention, characterised in that the method comprises forming a mush of the constituents of the lining layer with an organic lubricant, spreading said mush over said sintered layer, and applying heat and pressure to force said mush into the interstices of said sintered layer, to solidify the mush, and to give it a smooth surface.

The invention also provides a method of manufacturing a plain bearing according to the invention, characterised in that the method comprises forming a dry paper material from a blended furnish comprising the constituents of the lining layer, and fusing said paper material to said sintered layer.

There now follow examples which illustrate the invention.

EXAMPLE 1

In the example, one liter of an aqueous dispersion of PTFE (Fluon GP 2 from ICI) is mixed with 500 ml of an organic lubricant (Toluene) by stirring them together in a low-speed mixer for one hour. To this mixture 15% by volume (of the solid content of the PTFE dispersion) of finely powdered calcium fluoride was added and stirred into the mixture. Next, an aqueous slurry of fibrillated aramid fibres (sold as Kevlar Grade If 368 by Du Pont) was made by processing in a hydropulper to produce an aqueous slurry followed by disc refining to give the require degree of fibrillation, and was added to the mixture to give 5% by solid volume of the fibres.

The mixture was stirred for 5 minutes and then 10 ml of a 10% aqueous solution of aluminium nitrate was added to coagulate the suspension. The slurry so obtained was stirred for 10 minutes and then allowed to settle out. The supernatent liquid was then decanted and discarded leaving a wet mush.

The mush was fed by hand over a sintered bronze interlayer secured to a steel backing. Heat and pressure was then applied to the mush by rollers to infiltrate it into the pores of the interlayer, to solidify it, and to give it a smooth surface. This gave a bearing material with a surface 0.025 mm above that of the interlayer. The bearing, thus produced, had a lining layer having a PTFE matrix containing 5% by volume fibrillated aramid fibres and 15% by volume of calcium fluoride.

The bearing material was formed into cylindrical bearing bushes which, under test, were found to have good friction characteristics and superior cavitation erosion resistance.

EXAMPLE 2

One liter of an aqueous dispersion of PTFE (Fluon GP2 from ICI) was mixed with 500 ml of an organic lubricant (toluene) by stirring them together in a low speed mixer for 1 hour. To this mixture 300 gms of PPS powder (Fortron from Hoechst) was added and stirred into the mixture. Next, 3.2 liters of 2% by weight solids aqueous slurry of fibrillated aramid fibres (poly-(p-phenyleneterephthalamide) sold as fibrillated Kevlar by Du Pont) was added to the mixture.

The mixture was stirred for 5 minutes and then 10 ml of a 10% aqueous solution of aluminium nitrate was added to coagulate the suspension. The slurry so obtained was stirred for 10 minutes and then allowed to settle out. The supernatant liquid was then decanted and discarded, leaving a wet mush.

The mush was spread by hand over a sintered bronze interlayer secured to a steel backing. Heat and pressure was then applied to the mush by rollers to infiltrate it into the interstices of the interlayer, to solidify it, and to give it a smooth surface. This gave a bearing material with a surface 0.025 mm above that of the interlayer. The surface was, thus, formed from a surface material comprising PTFE, PPS and reinforcing fibres. Microscopic examination revealed that the PPS was present as domains within the PTFE, the domains being distributed throughout the surface material. Since the PPS wets the fibres (which PTFE does not), the reinforcing fibres were anchored in the surface material by adhesion to the PPS domains. As the domains were large enough to, on average, adhere to several fibres, the fibres were joined by the domains and formed a network within the surface material.

The bearing material was formed into cylindrical bearing bushes which, under test, were found to have good friction characteristics, high strength and good wear-resisting properties.

EXAMPLE 3

The following constituents were mixed in a high speed mixer: 1 liter of a 2% aqueous suspension of fibrillated Kevlar pulp, PPS powder (Fortron) sufficient to give 60% by volume, and PTFE powder (Fluon L169) sufficient to give 30% by volume.

The mixture was treated in the same way as the mixture described in Example 2 and bushes were made in the same way with similar results.

EXAMPLE 4

PPS powder was omitted from the ingredients mentioned in Example 2 but instead an aqueous dispersion of a melt-processable fluorocarbon polymer was included. Specifically, the fluorocarbon was:

tetrafluoroethylene-perfluoroalkylvinylether copolymer (hereinafter called "teflon PFA").

The ingredients were adjusted to give a surface material with the following percentages by volume:

fibres lot, PTFE 87%, teflon PFA 3%

Bushes were made as described in Example 2 and were found to have a satisfactory wear resistance.

EXAMPLE 5

Example 4 was repeated except that the teflon PFA was added as powder and stirred into the mixture. The quantity of teflon PFA was also increased to 10% at the expense of a reduction to 80% of the PTFE. The bushes again gave satisfactory results.

EXAMPLE 6

Example 5 was repeated except that the fibre content was reduced to 1% and the quantity of non-PTFE polymer was increased to 19%. Instead of teflon PFA alone, an intimate mixture of teflon PFA and a particulate filler, fine synthetic precipitated calcium fluoride was used to give a composition by volume of fibres 1%, PTFE 80%, teflon PFA 9% and calcium fluoride 10%. The calcium fluoride was included to increase wear resistance and cavitation erosion resistance.

EXAMPLE 7

Example 6 was repeated but with the fibre content at 9%, the teflon PFA at 1% (added as a dispersion) and the calcium fluoride at 10%.

EXAMPLE 8

A dry paper material was produced from a blended furnish comprising: fibrillated Kevlar pulp in an aqueous suspension, present at 10% weight solids of the furnish, Fortron PPS powder 45% weight solids, Fluon GP2 PTFE dispersion 45% weight solids.

Continuous paper coil was made from the furnish using a Fourdrinier paper making machine. The paper was produced at a dry thickness of 0.40 mm and consisted of a matrix of fibrillated Kevlar fibres with dry PTFE and PPS fine particles evenly distributed and held within the matrix.

The paper was fused and bonded to a steel backing with a sintered bronze interlayer by the application of heat and pressure such that the resulting material was void free and of even thickness in a layer over the metal backing of 0.025 mm. Bushes were formed from the composite strip.

EXAMPLE 9

Example 8 was repeated except that 10% of the PPS powder was replaced by diphenyl sulphone powder which was intimately mixed with the PPS powder before the latter was added to the mixture. The diphenyl sulphone acts as solvent for PPS in the melt phase and thus enhances the ability of the PPS to wet the fibres.

After leaving the paper making machine and before bonding to the backing, the paper was strengthened by infra-red heating and rolling through a mill, thus melting and consolidating the PPS phase.

What is claimed is:

1. A plain bearing comprising a metal backing layer, a porous sintered layer on said backing layer, and a lining layer infiltrating said porous sintered layer and standing proud therefrom, said lining layer comprising a bearing material comprising a matrix of polytetrafluoroethylene and fibrillated aramid fibers embedded in said matrix, wherein said matrix infiltrates said porous sintered layer.

2. The plain bearing according to claim 1, wherein the concentration of said fibrillated aramid fibers in said bearing material is 2 to 10% by volume.

3. The plain bearing according to claim 2 wherein said matrix further includes up to 28% by volume of a filler.

4. The plain bearing according to claim 3 wherein said filler is calcium fluoride.

5. The plain bearing according to claim 3 wherein the filler is a polymeric material selected from the group consisting of tetrafluoroethylene-perfluoroalkylvinylether copolymers, tetrafluoroethylene-hexafluoropropylene copolymer, tetrafluoroethylene-propylene ether polymer, tetrafluoroethylene-ethylene copolymer, polychlorotrifluoroethylene polymers, polychlorotrifluoroethylene-ethylene copolymers, hexafluoroisobutylene polymers, hexafluoroisobutylene-vinylidene fluoride copolymers, and hexafluoropropylene polymer.

6. The plain bearing according to claim 1 wherein said matrix comprises at least a second polymeric material dispersed therein, said second polymeric material being suitable for wetting and adhering to said fibrillated aramid fibers.

7. The plain bearing according to claim 6 wherein said second polymeric material is polyphenylene sulphide.

8. The plain bearing according to claim 1 wherein said fibrillated aramid fibers have an average length of 0.2 to 1 mm.

9. A method of manufacturing an oil-lubricated plain bearing having cavitation-erosion resistance, said method comprising:

forming a bearing material of polytetrafluoroethylene and fibrillated aramid fibers;

applying said bearing material to a metal backing having a porous sintered layer thereon; and treating said bearing material such that it infiltrates said porous sintered layer.

10. The method according to claim 9, wherein forming a bearing material comprises forming a mush comprising at least polytetrafluoroethylene, fibrillated aramid fibers and an organic lubricant; and wherein treating said bearing material comprises applying pressure and heat to said mush to solidify it.

11. A method according to claim 9, wherein forming a bearing material comprises forming a dry paper material comprising at least polytetrafluoroethylene and fibrillated aramid fibers; and treating said bearing material comprises applying heat and pressure to said dry paper material to fuse it to said metal backing layer.

* * * * *